Figure 1:
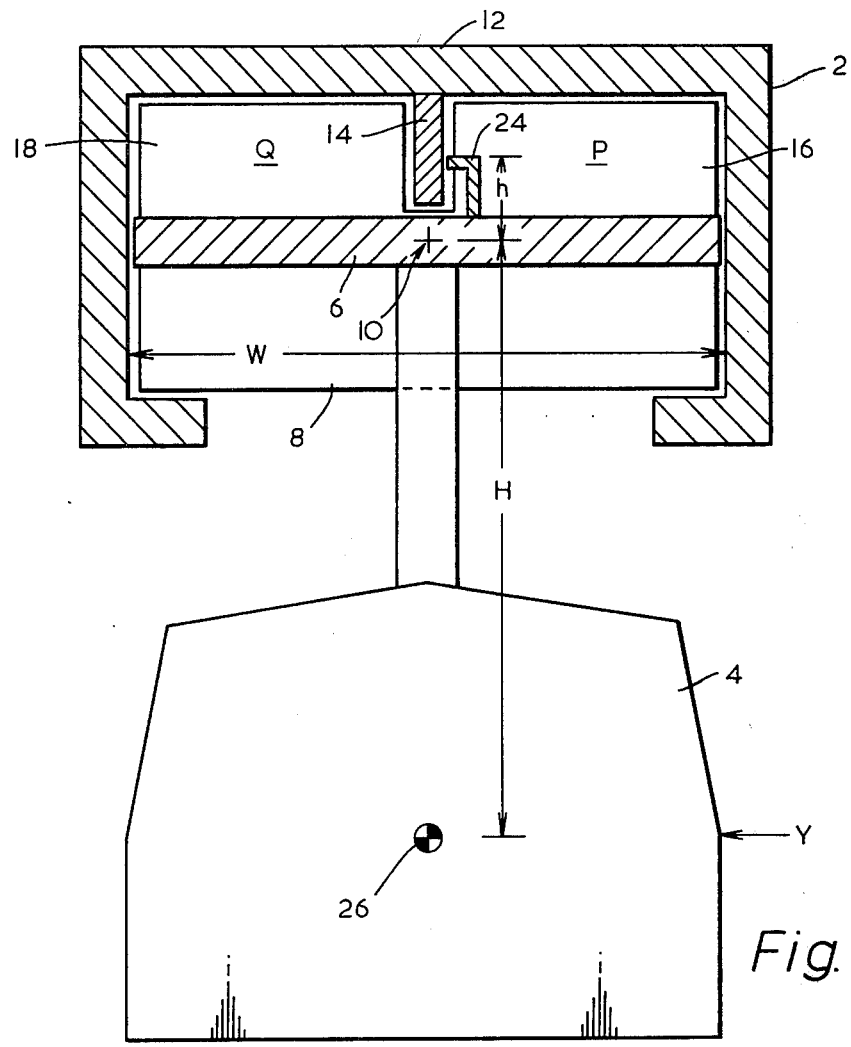

United States Patent [19]

Bliss

[11] 4,002,124
[45] Jan. 11, 1977

[54] TRACKED AIR CUSHION VEHICLE SYSTEMS

[75] Inventor: Denys Stanley Bliss, Great Shelford, England

[73] Assignee: Bliss Pendair Limited, London, England

[22] Filed: Aug. 21, 1975

[21] Appl. No.: 606,357

[30] Foreign Application Priority Data

Sept. 2, 1974    United Kingdom ............ 38189/74

[52] U.S. Cl. .............................. 104/23 FS; 104/134
[51] Int. Cl.$^2$ ........................................ B61B 13/08
[58] Field of Search ...................... 104/23 FS, 134; 180/115, 118, 120, 122, 125, 129; 114/122; 137/45, 46

[56] References Cited

UNITED STATES PATENTS

| | | | |
|---|---|---|---|
| 2,971,499 | 2/1961 | Curlett | 137/46 X |
| 3,559,759 | 2/1971 | Hart | 104/23 FS X |
| 3,575,115 | 4/1971 | Giraud | 104/23 FS |
| 3,727,573 | 4/1973 | Prohaska | 114/122 |
| 3,797,398 | 3/1974 | Bliss | 104/23 FS |
| 3,835,952 | 9/1974 | Croix-Marie et al. | 104/23 FS X |

Primary Examiner—Robert J. Spar
Assistant Examiner—Randolph A. Reese
Attorney, Agent, or Firm—Baldwin, Wight & Brown

[57] ABSTRACT

A tracked air cushioned vehicle system comprising an inverted channel section track and a vehicle body suspended from a lift platform guided by end bogies. The platform and bogies define a chamber with the track, which chamber is maintained at subatmospheric pressure. The chamber is divided longitudinally into two separate subchambers, the dividing member including sealing members cooperating with the track and a gravitationally displaceable member is provided which is responsive to any lateral force exerted on the body except those due to centrifugal action, to cause a differential pressure between the subchambers for causing a rolling moment to be applied to the platform to counteract the lateral force. The dividing member may include a longitudinal flange depending from the roof of the track or a beam extending between the bogies and a flexible member extending longitudinally of the platform between the beam and the platform. A damped pendulum or a lateral accelerometer may be used to control the differential pressure.

8 Claims, 8 Drawing Figures

TRACKED AIR CUSHION VEHICLE SYSTEMS

This invention relates to tracked air cushion vehicle systems, and more particularly to improvements and developments of the systems disclosed in British Pat. No. 1,334,874, which generally corresponds to U.S. Pat. No. 3,797,398.

In the specification of that patent, there is disclosed a tracked air cushion vehicle system in which a vehicle body is suspended from a lift platform extending between end bogies, the lift platform and the bogies cooperating with an inverted channel section track to define a chamber within which a subatmospheric pressure is maintained so as to sustain the weight of the lift platform and the vehicle body suspended from it.

When the vehicle body and the lift platform are more or less rigidly connected, the application of a side force to the vehicle body, for example as a result of wind force, will result in both a corresponding lateral force and a turning moment being applied to the lift platform. This in turn will result in tilt of the lift platform and vehicle body until the lateral displacement of the center of gravity of the vehicle results in the application of an equal and opposite moment. While tilting the vehicle is desirable on corners in order to ensure passenger comfort, tilting of the vehicle due to other types of lateral forces such as wind forces is undesirable both from the point of view of passenger comfort and because of the larger clearances required on either side of the vehicle on straight stretches of track. Tilting the vehicle and lift platform will cancel the horizontal force applied, compensation being from the horizontal component of the force applied normal to the lift platform surface by the cushion pressure.

Further, in a practical vehicle system in which tilting movement of the vehicle is possible, it is necessary to provide some form of anti-roll stabilization to damp out unwanted rolling movements of the vehicle about the longitudinal axis of the lift platform.

A first object of the present invention is to provide a system of the type described in which lateral forces applied to the vehicle can be counteracted without tilting of the vehicle and without a resultant lateral force acting on the lift platform.

A further object of the invention is to provide roll control means for a system of the type described in which tilting movements of a vehicle to accommodate cornering forces are permitted, but other tilting movements are resisted.

According to the invention a tracked air cushion vehicle system comprises an inverted channel section track, a vehicle lift platform received within the track, a vehicle body connected to the lift platform, the body and the platform being capable of conjoint vertical and rolling movements relative to the track, bogies at each end of the platform for guiding the latter in longitudinal movement relative to the track and cooperating therewith to enclose a chamber between the lift platform and the track, means for maintaining a subatmospheric pressure within said chamber, means dividing said chamber longitudinally into two separate sub-chambers, said chamber dividing means including sealing means cooperating with said track, and means responsive to any lateral force exerted on the body, except for lateral forces due to centrifugal action, to cause a differential pressure between the two sub-chambers for causing a rolling moment to be applied to said lift platform which is substantially equal and opposite to the rolling moment resulting from the lateral force exerted on the body.

Figure 2:
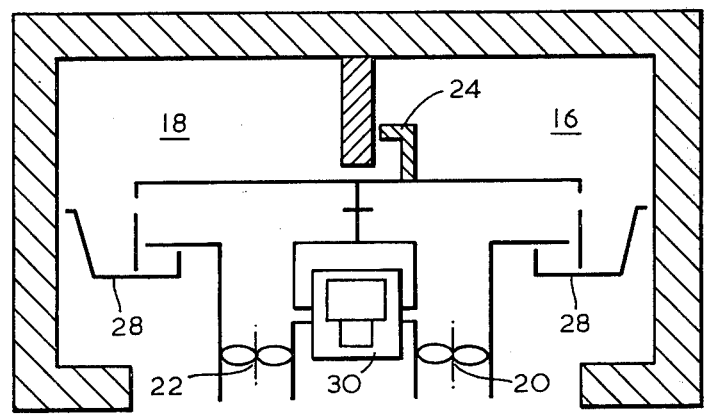
Figure 3:
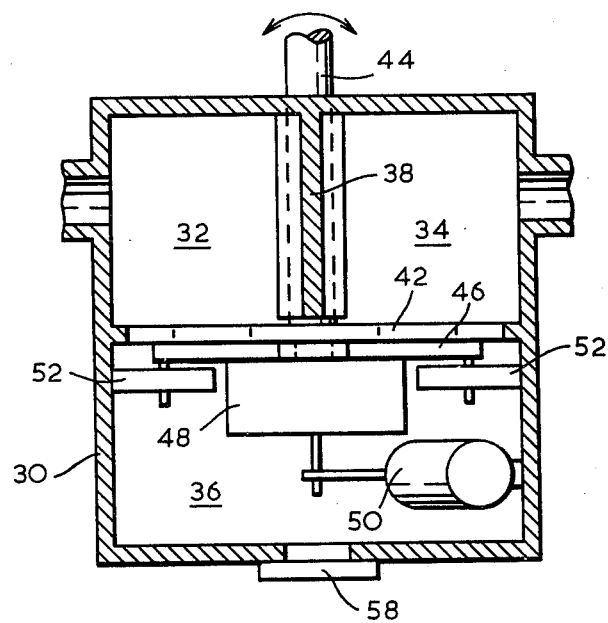
Figure 4:
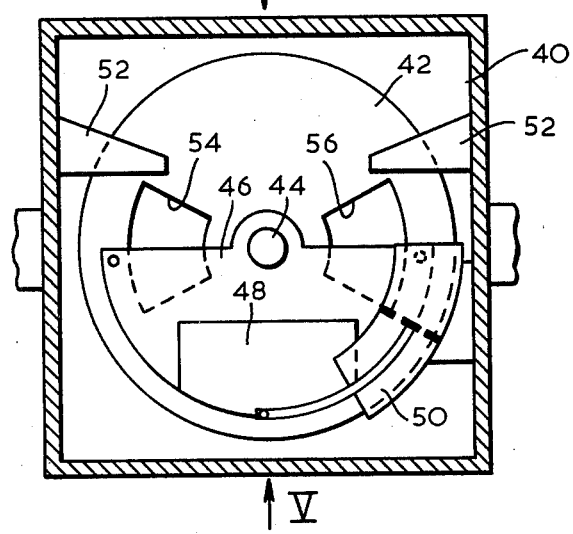
Figure 5:
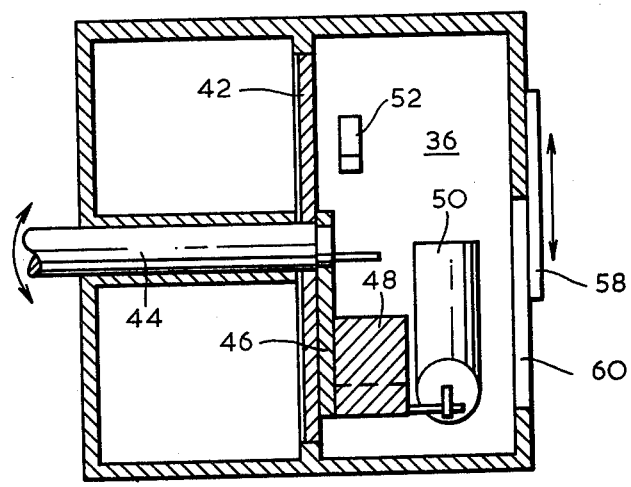
Figure 6:
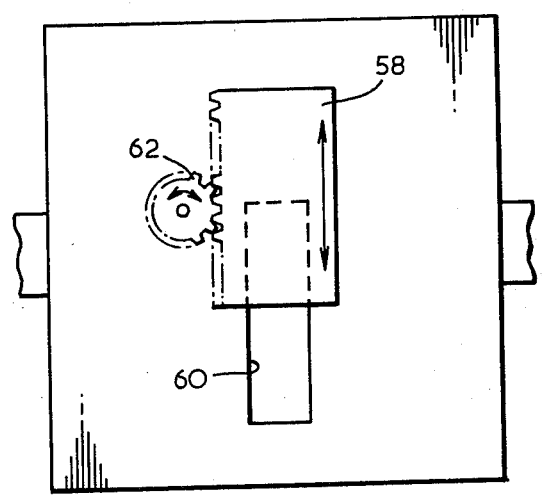
Figure 7:
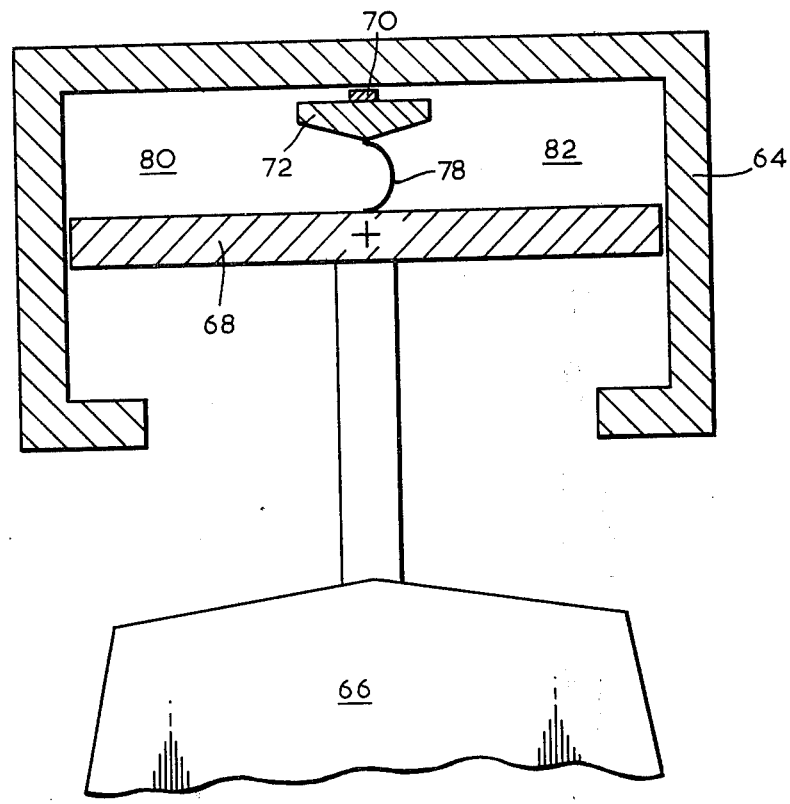
Figure 8:
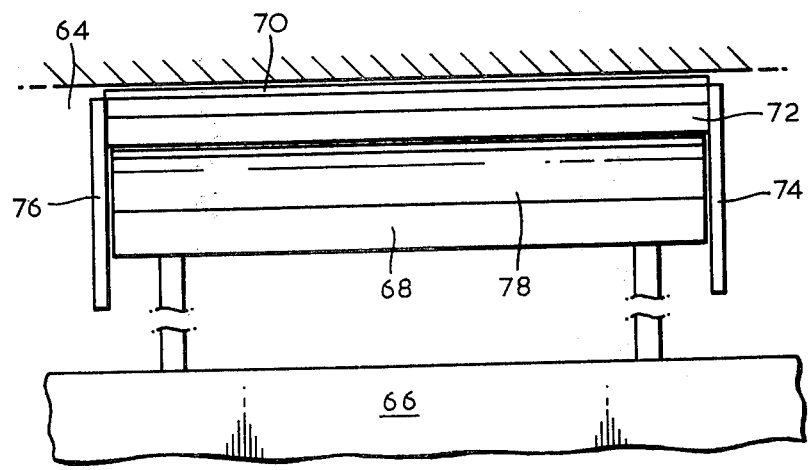

The invention is described further with reference to the accompanying drawings, in which:

FIG. 1 is a diagrammatic cross-section of the track and a vehicle of a track air cushion vehicle in accordance with the invention, FIG. 2 is a diagrammatic part cross-section corresponding to FIG. 1, but showing certain further details including roll control means, FIG. 3 shows the control box with its top portion cut away, FIG. 4 shows the control box with its front portion cut away, FIG. 5 is a vertical cross-section of the control box on the line V — V in FIG. 4, FIG. 6 shows a front elevation of the control box, and FIGS. 7 and 8 are diagrammatic views of another embodiment.

Referring first to FIG. 1, a tracked air cushion transportation system comprises an inverted channel section track 2, along which moves a vehicle comprising a vehicle body 4 suspended from a lift platform 6 extending between end plates or bogies 8 guided for movement longitudinally of the track. The lift platform 6 and the vehicle body 4 are free within limits to move vertically relative to the end plates or bogies 8 and to tilt about a roll axis 10 relative to the end bogies and the track 2. Centrally of the top wall 12 of the track is a depending flange 14 which may conveniently form a reaction plate for linear induction motors mounted on the end bogies 8. Cooperating with the flange 14 in order to divide the chamber defined between the lift platform 6, the end bogies 8 and the track 2 into two longitudinally extending sub-chambers 16 and 18 is an upstanding seal member 24 carried by the upper surface of the lift platform 6 and extending longitudinally substantially down the center of the latter. As best seen in FIG. 2, fans 20 and 22 are provided on the lift platform for extracting air independently from the chambers 16 and 18 and thus maintaining therein a subatmospheric pressure so that the lift platform and the vehicle body 4 are supported by atmospheric pressure acting on the lower surface of the lift platform 6. The upstanding sealing means 24 is arranged so that it maintains a substantially sealing relationship with the flange 14 regardless of movements of the lift platform and curvature of the track. Various techniques for achieving such a relationship are described in my U.K. Pat. Nos. 1,334,874 and 1,396,004 which generally correspond to U.S. Pat. Nos. 3,797,398 and 3,854,403 respectively.

If a side force Y due to wind pressure and acting through a center 26 is applied to the vehicle body, then a turning moment YH is applied to the platform, where H is the distance between the center 26 and the rotational axis 10 of the platform 6. A restoring couple may be applied by setting up a differential between the pressures P and Q maintained in the chambers 16 and 18, the pressures P and Q being negative with respect to adjacent atmospheric pressure with the negative pressure P being greater than the negative pressure Q. If the internal width of the track is W, and the chambers 16 and 18 are of equal width, then the restoring moment which results will be $$P \times (W/2) \times L \times (W/4) = Q \times (W/2) \times L \times (W/4)$$

where L is the length of the lift platform 6. This expression can be reduced to $$(P - Q)(LW^2/8)$$

The presence of the sealing means 24, which is considered to have an effective height h, results in an additional moment being applied to the platform aiding that applied as a result of the force Y. The magnitude of this additional moment is $$hL \times (h/2)(P - Q)$$

From the foregoing it will be seen that for rotational equilibrium of the platform when the body of the vehicle is subjected to a lateral force, $$YH + (hL \times h/2)(P - Q) = (P - Q)(LW^2/8)$$

Similarly, for lateral equilibrium the lateral force applied to the member 24 must be equal and opposite to the force Y, i.e.

$$Y = (P - Q) hL$$

By substituting this expression for Y in the equation for rotational equilibrium, Y, P and Q may be eliminated, and the expression reduced to $$Hh + (h^2/2) = (W^2/8)$$

This expression provides the relationship required between $h$, H and W for a moment applied by wind forces to be cancelled by setting up a pressure differential between the chambers 16 and 18, while at the same time also cancelling the lateral force applied to the platform.

If the balance of both wind and lateral force and the resulting rolling moment, as described in the above equation, cannot be achieved in practice, the residual roll angle must be acceptable or a lateral force will be transferred to the end bogies and their guidance system. For example, when a narrow track is used, W is small, and it is difficult to achieve a sufficiently low value of $h$ to balance both force and moment. If the differential pressure between the chambers then overcomes the rolling moment, the lateral force on sealing means 24 will be greater than the wind force Y. The difference will be transmitted to the end bogie through pivot connection 10 and reacted by the guidance system cooperating with the vertical walls of the track.

FIGS. 2 - 6 of the drawings illustrate how such a pressure differential may be applied between the chambers 16 and 18. FIG. 2, although still diagrammatic, shows certain further details of the lift platform 6 which is seen to have movable edge seal members 28 to maintain a seal between the edges of the platform and the walls of the track when the platform tilts and on curved sections of track. The construction of these edge seals may be as described in U.S. Pat. No. 3,854,403. The pressure maintained in the chambers 16 and 18 by the suction fans 20 and 22 is controlled in the example shown by the admission of air to the inlets of the fans from a control box 30 in the manner described in British patent application No. 38188/74 which is the priority document for my copending U.S. application Ser. No. 607,574, filed Aug. 25, 1974 and entitled "Improvements in the control of fans used to sustain the air cushion of an air cushion vehicle".

The construction of the control box is divided into three chambers 32, 34 and 36 by a fixed vane 38 which separates the chambers 32 and 34, and a diaphragm 40 the center portion of which is formed by a rotatable aperture plate 42 fast to a shaft 44 to which is turned relative to the unit 30 as a whole to an angle corresponding to the degree of tilt of the platform relative to the horizontal, this movement being transmitted to the shaft 44 by any suitable means, for example a cable drive. Journalled for swinging movement on the shaft 44 is a valve plate 46 incorporating a pendulum weight 48. Movement of the valve plate is critically damped by a damping device 50 secured to the case of the unit 30. Excess movement of the plate 46 is limited by stops 52.

Communication between the chamber 36 and the chambers 32 and 34 respectively is through ports 54 and 56, which parts are both uncovered when the plates 42 and 46 are in their rest positions, as when the lift platform is horizontal and the vehicle is not subject to any cornering forces which might displace the pendulum weight 48 from its rest position. Under these circumstances, the same amount of air will be admitted to both ports 54 and 56 and thence via chambers 32 and 34 to the inlets of the fan 20 and 22, resulting in the pressures in the chambers 16 and 18 being maintained equal.

Should the vehicle be subjected to cornering forces when passing through a bend in the track, these will act equally on the vehicle and the pendulum weight 48, and consequently both the plate 42 and plate 46 will be moved through the same angle. As a result, the relationship between the two plates will be unchanged, the exposed area of the ports 54 and 56 will remain unchanged, and the chambers 16 and 18 will be maintained at the same pressure.

However, should the vehicle body be subject to the effect of a side wind resulting in tilting of the vehicle body, the plate 42 will move relative to the plate 46, since the pendulum will be uneffected by the lateral force applied by the wind to the vehicle body, and the relative openings of the ports 54 and 56 will be altered causing different amounts of air to be admitted to the chambers 32 and 34 resulting in the setting up of a pressure differential between the chambers 16 and 18 so as to apply a restoring moment to the lift platform and so as to tend to return the latter to its normal attitude or at least to restrain deviation from the normal attitude. Likewise, roll movements of the vehicle body and hence the platform will also result in changes in the relative size of the ports 54 and will cause a moment to be applied to the platform resisting the rolling moment and hence damping it out. The control unit 30 is also used to control the height of the lift platform, the amount of air admitted to the chamber 36 being controlled by a slide valve 58 moving relative to an aperture 60 in the front of the unit. This slide valve is moved in response to vertical movement of the lift platform so as to increase the amount of air admitted to the chamber as the lift platform rises relative to the track, thus reducing the efficiency of fans 20 and 22, and vice versa. The slide valve 58 may be driven in any suitable manner responsive to vertical movements of the platform, for example to a cable driving the plate through a rack and pinion 62.

A number of variations in the arrangement described are possible. For example, the pendulum 48 may be mounted remotely, and signals indicative of the attitude of the pendulum and of the lift platform fed to a differential amplifying device, which gives no output so long as the lift platform and the pendulum move in synchronism, but gives a multiplied output of appropriate sign as soon as a difference in attitude is detected. This output is then used to control the pressures in the chambers 16 and 18 so that a pressure differential proportional to the output is maintained in the chambers.

Referring to FIGS. 7 and 8, an alternative embodiment of the invention comprises a track 64 which cooperates with a vehicle having a body 66 suspended from a platform 68.

A flexible member or web 78 extends between, and is attached to, platform 68 and a rigid beam 72. The beam 72 extends longitudinally of body 66 and joins ends bogies 74, 76. Sealing means 70 extends longitudinally of the beam 72 to cooperate with the roof of track 64. When sub-chambers 80, 82 are exhausted by a fan or fans (not shown) to provide a subatmospheric pressure, the platform 68 rises and the flexible member 70 deflects as shown in FIG. 7. The lateral force (due to the pressure differential) on the beam 72 plus half that on the flexible member 70 are transferred to the end bogie. The body rolling moment can, however, be reacted and this arrangement may be useful on short vehicles where the interconnecting beam is short and the track does not include a rail, such as rail 14 in FIG. 1.

What we claim is:

1. A tracked air cushion vehicle system comprising an inverted channel section track, a vehicle platform received within the track, a vehicle body connected to the lift platform, the body and the platform being capable of conjoint vertical and rolling movements relative to the track, bogies at each end of the platform for guiding the latter in longitudinal movement relative to the track and cooperating therewith to enclose a chamber between the lift platform and the track, means for maintaining a subatmospheric pressure within said chamber, means dividing said chamber longitudinally into two separate sub-chambers, said chamber dividing means including sealing means cooperating with said track, and means responsive to any lateral force exerted on the body, except for lateral forces due to centrifugal action, to cause a differential pressure between the two sub-chambers for causing a rolling moment to be applied to said lift platform which is substantially equal and opposite to the rolling moment resulting from the lateral force exerted on the body.

2. A system according to claim 1, wherein said dividing means comprises a longitudinal flange depending from the roof of said track, said flange dividing said chamber longitudinally into said sub-chambers, which sub-chambers are of substantially equal width, said sealing means cooperating with said flange.

3. A system according to claim 1, wherein said dividing means comprises a beam extending between said bogies and a flexible member extending longitudinally of said platform between said beam and said platform; said sealing means being provided between said beam and the roof of said track.

4. A system according to claim 1 wherein said means responsive to a lateral force comprises a gravitationally displaceable member.

5. A system according to claim 4 wherein said gravitationally displaceable member comprises a damped pendulum.

6. A system according to claim 5 including a valve coupled to said pendulum for allowing different flow rates to be applied between respective sub-chambers.

7. A system according to claim 6 wherein said pendulum is mounted on said body for directly controlling said valve.

8. A system according to claim 6 wherein said valve comprises an apertured cover plate and a valve plate superimposed over said cover plate, one of said plates having a pendulum weight attached thereto for causing relative movement between said differential pressure is applied.

* * * * *